March 22, 1955     L. R. DE VERTEUIL     2,704,553
FLUID FLOW CONTROLLING VALVES
Filed Sept. 13, 1950
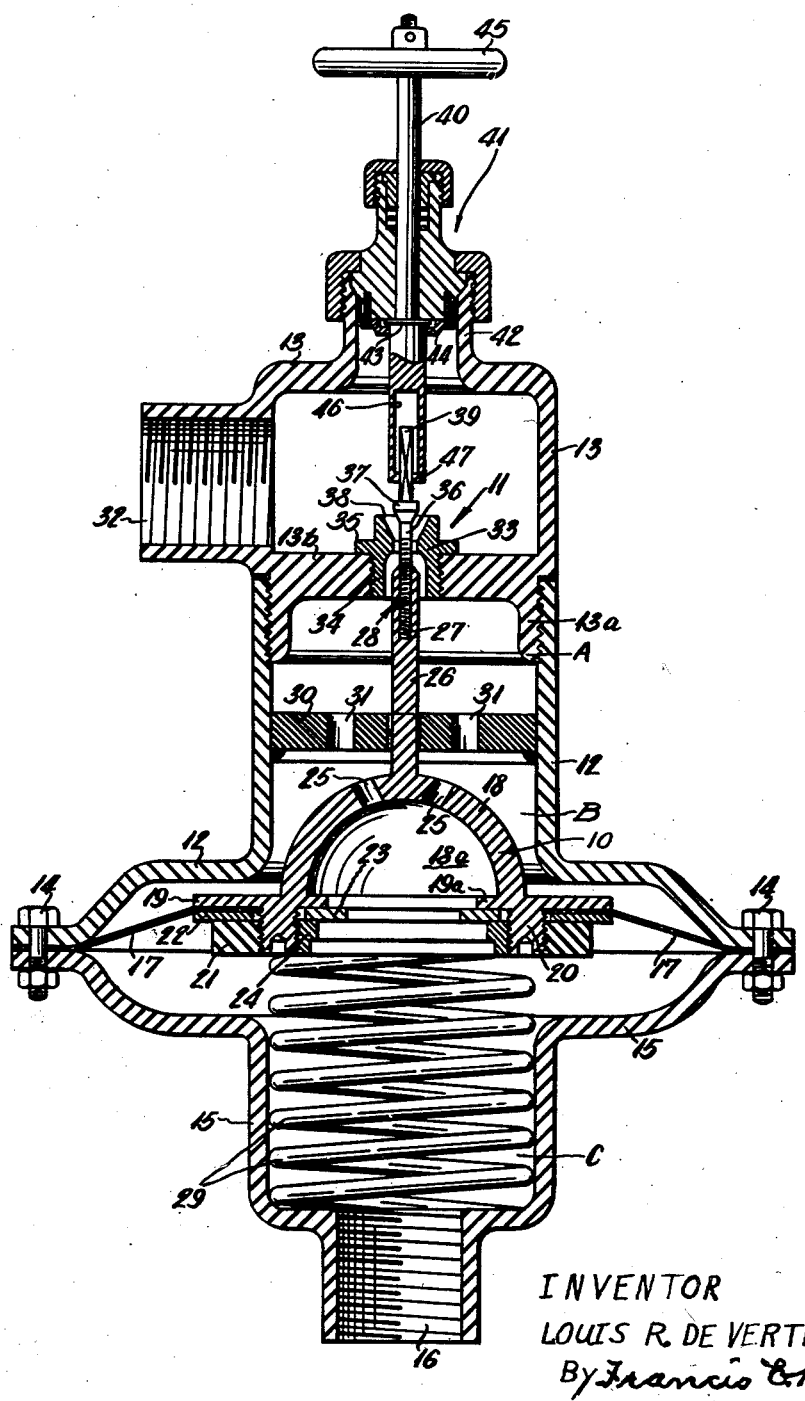
INVENTOR
LOUIS R. DE VERTEUIL
By Francis C. Boyce
Attorney

# United States Patent Office 2,704,553
Patented Mar. 22, 1955

2,704,553

FLUID FLOW CONTROLLING VALVES

Louis Rene de Verteuil, Siparia, Trinidad, British West Indies, assignor to Apex (Trinidad) Oilfields, Limited, London, England Application September 13, 1950, Serial No. 184,639

1 Claim. (Cl. 137—498)

This invention relates to fluid flow controlling valve apparatus and more particularly to valve arrangements for controlling fluid flow in rear of the valve, wherein a control valve assembly is provided to permit the flow of fluid therethrough, said fluid then passing through a measuring or metering orifice in a flexible diaphragm which actuates the control valve in accordance with the difference of pressures on its opposite sides due to flow of fluid through the measuring orifice.

One object of the present invention is to provide means for readily adjusting the rate of fluid flow through the valve in order to determine the specific differential pressure across the diaphragm.

A fluid flow control apparatus according to the present invention comprises a flexible diaphragm which has a metering orifice therein through which the fluid flows, a valve member which regulates the fluid flow through a port in a fixed valve seat provided in a control valve casing, said valve being connected to said diaphragm and being positioned by said diaphragm in accordance with the difference of pressure on opposite sides of the diaphragm, and means for adjusting the rate of fluid flow through said port, in order to determine the differential pressure across the metering orifice, said adjusting means being operative to adjust the axial position of said valve member relatively to the diaphragm to which it is connected.

The control valve member is adjustably secured to the diaphragm in order to permit axial movement of the valve member in relation to the diaphragm and to the fixed valve seat in the control valve casing.

Adjustment of the control valve member may be effected by manually operable means comprising an actuating spindle which, when rotated, serves to vary the axial position of the control valve member.

The invention will be more readily understood by referring to the accompanying drawing which illustrates a preferred manner of carrying out the invention and shows a vertical cross sectional view of the apparatus.

In the drawing a metallic housing is shown enclosing a measuring or metering orifice assembly 10 and a control valve assembly 11. The metallic housing comprises a cylindrical flanged valve housing 12 provided at its upper end with an inlet port member 13 and having its lower flanged end secured by means of bolts 14 to a flanged portion of a housing 15 provided with an outlet port 16. The peripheral region of a flexible diaphragm 17 is interposed between the flanged portions of the housings 12 and 15 and is clamped therebetween by means of the bolts 14.

The measuring orifice assembly 10 is secured in a fluid-tight manner to the centre of the diaphragm 17 and comprises a ported dome 18 provided with an external flange 19 forming an annular seating for the diaphragm 17. An externally and internally screw-threaded collar 20 extends downwardly from the flange 19 and is provided on its external thread with a clamping ring 21 adapted to be screwed upwardly to bear against a sealing ring 22 interposed between the diaphragm 17 and the clamping ring 21, thus effectively securing the dome 18 to the diaphragm 17. The flange 19 is continued internally of the dome 18 to form an annular seating 19a for a measuring-orifice-disc or plate 23 which has a metering orifice therein and is detachably secured by means of a clamping ring 24 secured in the internal thread of the collar 20. The dome 18 above the flange 19, 19a is of hemispherical shape and is provided therein with ports 25 connecting a cavity 18a defined by the dome 18 with the annular space defined by the cylindrical control valve housing 12. The measuring orifice assembly 10 is directly connected to the control valve assembly 11 by means of an upwardly extending valve actuating spindle 26 integral with the dome 18 and provided in its upper end with a screw-threaded recess 27 which receives a similarly threaded extension of a control valve member 28. The recess 27 is greater in depth than the threaded extension of the control valve member 28, thus permitting a considerable axial adjustment of said control valve member 28. The housing 15 surrounds a helical spring 29 confined between the base of the housing and the underside of the orifice assembly 10 in such a manner that downward movement of the diaphragm 17 is opposed by the spring 29.

The actuating spindle 26 is guided for axial movement in a guide plate 30 located within the cylindrical portion of the control valve housing 12 and ports 31 are provided in the guide plate 30. The upper end of the cylindrical valve housing 12 is secured to a downwardly extending cylindrical portion 13a of the inlet port member 13 which is provided with an internally screw threaded inlet port 32. A flanged internal extension 13b of the cylindrical portion 13a forms the bottom wall of the member 13 and also serves to support a valve seat 33 surrounding the control valve member 28. The seat 33 may be screw-threaded into a similarly threaded recess 34 formed in the flanged extension 13b and may be provided with a collar 35 adapted to bear against the upper surface of the flanged extension 13b when the seat 33 is screwed downwardly in the recess 34.

The control valve member 28 comprises a valve stem 36, the lower end of which is secured to the actuating spindle 26, and a conical valve head 37 adapted to seat in a conical recess 38 formed in the upper end of the valve seat 33. The valve stem 36 extends, above the valve head 37, in the form of a flat-sided extension 39, the length of which is greater than the length of the screw-threaded portion of the lower end of the valve stem 36. A manually-operable key 40 is provided for rotating the valve stem 36 and thus causing it to move upwardly or downwardly in the threaded recess 27. The key 40 comprises a cylindrical stem mounted for rotational movement in a gland assembly 41 mounted on an upwardly extending sleeve 42 forming part of the member 13. A collar 43 is provided on the stem of the key and is confined between the lower face of the gland assembly 41 and a stirrup member 44 secured to the underside of the gland assembly 41. The collar 43 thus prevents axial movement of the key 40 when the latter is rotated in the gland assembly 41 by means of a handle 45 secured to the key. A counter-bored recess 46 is formed in the lower end of the stem of the key 40 and may be of greater length than the flat-sided extension 39 which it is adapted to surround. The lower end of the counter bored recess 46 is closed by a bridge piece 47 having a flat-sided hole formed therein for the reception of the extension 39, the arrangement being such that, upon turning movement of the key 40, the valve stem 36 will also be rotated and moved in an axial direction, so that the valve head 37 moves towards or away from the valve seat 33. It will thus be seen that the adjustment provided permits a variation of the porting of the control valve assembly 11.

The apparatus as hereinbefore described is particularly adapted to be incorporated, by means of the inlet and outlet ports 32 and 16, in the pipe line of a fluid system in order to control the rate of flow in accordance with the pressure in rear of or downstream of the valve apparatus. The arrangement of the apparatus is such that when flow is instituted, the fluid flows through the inlet port 32 and into the member 13 and from thence through the induction porting of the control valve assembly 11 defined by the conical valve seat 38 and valve head 37. The fluid then flows into the cavity A formed between the flanged extension 13b and guide plate 30 and through the ports 31 into the cavity B between the guide plate 30 and the diaphragm 17. The fluid then flows from cavity B, through ports 25 in the dome 18 into the cavity 18a and through the measuring orifice plate 23 into the cavity C defined by the diaphragm 17 and the orifice housing 15 and from thence through the outlet port 16.

It is an essential prerequisite of any flow control system that the flow system permits of a greater rate of flow in the absence of a control valve than that rate of flow specified as the desired controlled rate, and furthermore, it is preferred to arrange that the differential pressure across the measuring orifice be within the range of variation of differential pressure employed in commercial practice.

For any one size of metering or measuring orifice in the plate 23, the value of the differential pressure, created across the orifice by the flow of fluid through it is a function of the rate of flow. As the orifice 23, is sealed in the orifice assembly 10, which is in turn sealed to the flexible diaphragm 17, the differential pressure across the orifice is also imposed across the flexible diaphragm. The differential pressure thus imposed across the diaphragm is opposed by the helical steel spring 29, the lower end of which bears against the housing 15.

As the amount of compression of the helical spring 29 is a linear function of any load imposed thereon, it follows that the axial movement of the orifice plate and the diaphragm is a linear function of the change of differential pressure across the measuring orifice and diaphragm and is consequently a function of the change of rate of flow. Hence for any pre-selected orifice size there is a definite axial position of the orifice plate and associated valve actuating spindle 26, for any one differential pressure and thus for the corresponding rate of flow. As the valve actuating spindle 26, is screwed to the valve stem 28, it follows that the axial position of the valve head 37 itself, is defined by the rate of flow.

The axial position of the valve head 37, can be manually adjusted relative to that of the orifice assembly 10, by rotation of the key 40, which turns the valve stem 39, and so results in axial movement of the valve head, as the threaded part of the stem of the valve screws into, or out from the threaded recess 27 in the actuating spindle 26.

It follows that, for any selected axial position of the valve head 37 relative to the orifice assembly 10, the differential pressure is for all practical purposes a specific amount and the rate of flow is also specific for any one size of metering or measuring orifice.

I claim:

Fluid flow control valve apparatus comprising a housing having a lateral inlet port at one end thereof, a centrally ported division element dividing the interior of said housing into an inlet chamber open to said inlet port and an outlet chamber, a diaphragm casing into which said outlet chamber opens, a flexible centrally apertured transverse diaphragm dividing said casing into inlet and outlet compartments communicating with each other through a central aperture in said diaphragm, and said central aperture being in alignment with the central port in said division element, an outlet connection from the outlet compartment of said diaphragm casing, a ring clamped to said diaphragm and positioned within the central aperture therein, said ring defining a metering orifice through said diaphragm, a dome-shaped member secured at its base to said diaphragm concentrically with respect to said ring, said dome-shaped member being apertured and extending from said diaphragm into the inlet compartment of said diaphragm casing, a spindle extending from the centre of the crown of said dome-shaped member to the central port in said division member, a spring urging said diaphragm in a direction to move said spindle axially towards said central port, means in said housing for axially guiding said spindle, a valve seat secured in said central port, a valve head cooperating with said valve seat and adjustably connected to said spindle by screw-threaded connection thereto, a key extending from said valve head into said inlet chamber in axial alignment with said spindle, a rotary member extending through said housing into said inlet chamber in axial alignment with said key, said rotary member passing through a stuffing box in said housing and having a keyway slidably engaging said key, and means externally of said housing for manually turning said rotary member to effect adjustment of the screw-threaded connection between said valve head and spindle, thereby axially adjusting the valve head with respect to the valve seat.

References Cited in the file of this patent

UNITED STATES PATENTS

| | | |
|---|---|---|
| 316,626 | Jackson | Apr. 28, 1885 |
| 375,071 | Jackson | Dec. 20, 1887 |
| 734,993 | Stewart | July 28, 1903 |
| 1,038,527 | Coleman | Sept. 17, 1912 |
| 1,376,745 | Crawford | May 3, 1921 |
| 1,933,852 | Hahn | Nov. 7, 1933 |
| 2,023,361 | Tigges | Dec. 3, 1935 |
| 2,569,285 | Brown | July 20, 1951 |

FOREIGN PATENTS

| | | |
|---|---|---|
| 230 | Great Britain | 1856 |
| 8,263 | Great Britain | 1894 |
| 15,083 | Great Britain | 1898 |